United States Patent
Tsirkin et al.

(10) Patent No.: US 9,934,157 B2
(45) Date of Patent: Apr. 3, 2018

(54) POST-COPY VM MIGRATION SPEEDUP USING FREE PAGE HINTING

(71) Applicant: Red Hart Israel, LTD, Raanana (IL)

(72) Inventors: Michael Tsirkin, Yokeneam Yillit (IL); David A. Gilbert, Manchester (GB)

(73) Assignee: Red Hat Israel, Ltd., Raanana (IL)

( * ) Notice: Subject to any disclaimer, the term of this patent is extended or adjusted under 35 U.S.C. 154(b) by 42 days.

(21) Appl. No.: 14/952,833

(22) Filed: Nov. 25, 2015

(65) Prior Publication Data

US 2017/0147501 A1 May 25, 2017

(51) Int. Cl.
G06F 12/10 (2016.01)
G06F 12/1009 (2016.01)

(52) U.S. Cl.
CPC .... *G06F 12/1009* (2013.01); *G06F 2212/151* (2013.01); *G06F 2212/254* (2013.01); *G06F 2212/261* (2013.01)

(58) Field of Classification Search
CPC ........... G06F 12/1009; G06F 2212/254; G06F 2212/15; G06F 2212/261; G06F 9/45558; G06F 2009/45583; G06F 9/45533; G06F 2201/815; G06F 2212/152; G06F 2212/151
USPC .......................................................... 711/5, 6
See application file for complete search history.

(56) References Cited

U.S. PATENT DOCUMENTS

| | | |
|---|---|---|
| 8,370,560 B2 | 2/2013 | Dow et al. |
| 8,694,712 B2 | 4/2014 | Sheu et al. |
| 8,909,845 B1 | 12/2014 | Sobel et al. |
| 8,990,531 B2 | 3/2015 | Ahmad |
| 9,058,197 B2 * | 6/2015 | Li ........................ G06F 9/45558 |

(Continued)

OTHER PUBLICATIONS

Sitaram Iyer et al., "Application-assisted physical memory management for general-purpose operating systems," p. 1-16, Rice University, Houston, TX.

(Continued)

*Primary Examiner* — Jasmine Song
(74) *Attorney, Agent, or Firm* — Lowenstein Sandler LLP (57) ABSTRACT

A system and methods for migrating a virtual machine (VM). In one embodiment, a hypervisor receives a request to migrate the contents of a memory of a source VM in a first physical memory area to a destination VM in a second physical memory area, where the first and second physical memory areas are disjoint. The hypervisor executes the destination VM in response to the request, and detects an access of a page of memory of the destination VM. The hypervisor determines, in view of a data structure maintained by a guest operating system executing in the destination VM, that a first page of a memory of the source VM in the first physical memory area is currently in use by the destination VM. In response to the detecting, the hypervisor: copies, in view of the first page of VM memory being used by the destination VM, the contents of the first page to a corresponding page of the destination VM; and maps, in view of a second page of VM memory not being used by the destination VM, (i) a physical memory page that is external to the first physical memory area and to the second physical memory area to (ii) a page of the destination VM corresponding to the second page.

20 Claims, 4 Drawing Sheets

(56) References Cited

U.S. PATENT DOCUMENTS

2011/0119427 A1* 5/2011 Dow .................... G06F 9/5088
711/6
2013/0031292 A1 1/2013 Van Riel
2013/0031293 A1 1/2013 Van Riel

OTHER PUBLICATIONS

Kevin Lawton, "Boosting server utilization 100% by accelerated VM migration (MemoryMotion™)," Apr. 23, 2009, p. 1-3, http://www.trendcaller.com/2009/04/boosting-server-utilization-from-60-to.html, accessed, Nov. 25, 2015.
Jui-Hao Chiang "Optimization Techniques for Memory Virtualization-based Resource Management," Dissertation, Dec. 2012, p. 1-152, Stony Brook University.

* cited by examiner

POST-COPY VM MIGRATION SPEEDUP USING FREE PAGE HINTING

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device (e.g., a network interface device, a CD-ROM drive, etc.), part of a device, or part of a plurality of devices that are part of or connected to the host machine. The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method for migrating virtual machines. In accordance with one embodiment, a hypervisor executed by a processing device of a physical machine receives a request to migrate the contents of a memory of a source virtual machine (VM) in a first physical memory area to a destination VM in a second physical memory area, wherein the first physical memory area and the second physical memory area are disjoint. In response to the request, the hypervisor: determines, in view of a data structure maintained by a guest operating system executing in the destination VM, that a first page of a memory of the source VM in the first physical memory area is currently in use by the destination VM; and copies, in view of the first page being used by the destination VM, the contents of the first page of VM memory to a corresponding page of the destination VM. Further in response to the request, the hypervisor determines, in view of the data structure, that a second page of the memory of the source VM in the first physical memory area has not been used by the destination VM; and maps, in view of the second page not being used by the destination VM, (i) a physical memory page that is external to the first physical memory area and to the second physical memory area to (ii) a page of the destination VM corresponding to the second page.

In some embodiments, the first physical memory area and second physical memory area may be associated with the same physical machines, while in some other embodiments the first physical memory area may be associated with a different physical machine than the second physical memory area. In one implementation, the hypervisor manages the execution of the destination VM, and a different hypervisor manages the execution of the source VM. In one aspect, the hypervisor associated with the destination VM receives a message specifying an address of the data structure, from the different hypervisor associated with the source VM.

In some other embodiments, the physical memory page that is external to the first physical memory area and to the second physical memory area is a zero page of the physical machine (a page in which each memory location reads as the value zero), and the mapping to the zero page is a read-only mapping, which is more efficient and is more likely to provide a net improvement in performance, in view of the heuristic that a page unused in the past is more likely to remain unused in the future than a previously-used page.

In some implementations, when the hypervisor detects a command to write to the page in the second physical memory area that is mapped to the zero page, the hypervisor allocates a writeable physical memory page and maps the page in the second physical memory to the allocated writeable physical memory page instead of to the zero page. In one embodiment, when the hypervisor determines that every page of the destination VM has been copied or mapped, the hypervisor generates a signal that indicates that the migration has completed.

Embodiments of the present disclosure thus enable virtual machines to be migrated more efficiently than techniques of the prior art, in which all memory pages of the source VM are copied to the memory of the destination VM, regardless of whether or not a particular memory page is currently in use by the destination VM. In contrast, embodiments of the present disclosure map pages of the destination VM corresponding to unused pages of the source VM to a zero page (or some other external physical page), thereby avoiding the overhead of copying the contents of the page from source to destination. In addition, by handling page faults and invalid writes to the pages of the destination VM that are mapped rather than copied, execution of the destination VM can be completed without copying all memory contents to the destination VM. In contrast, in some techniques of the prior art the destination VM cannot complete and the source VM cannot be destroyed and its memory reused until the entire memory the source VM has been copied to the destination VM.

Figure 1:
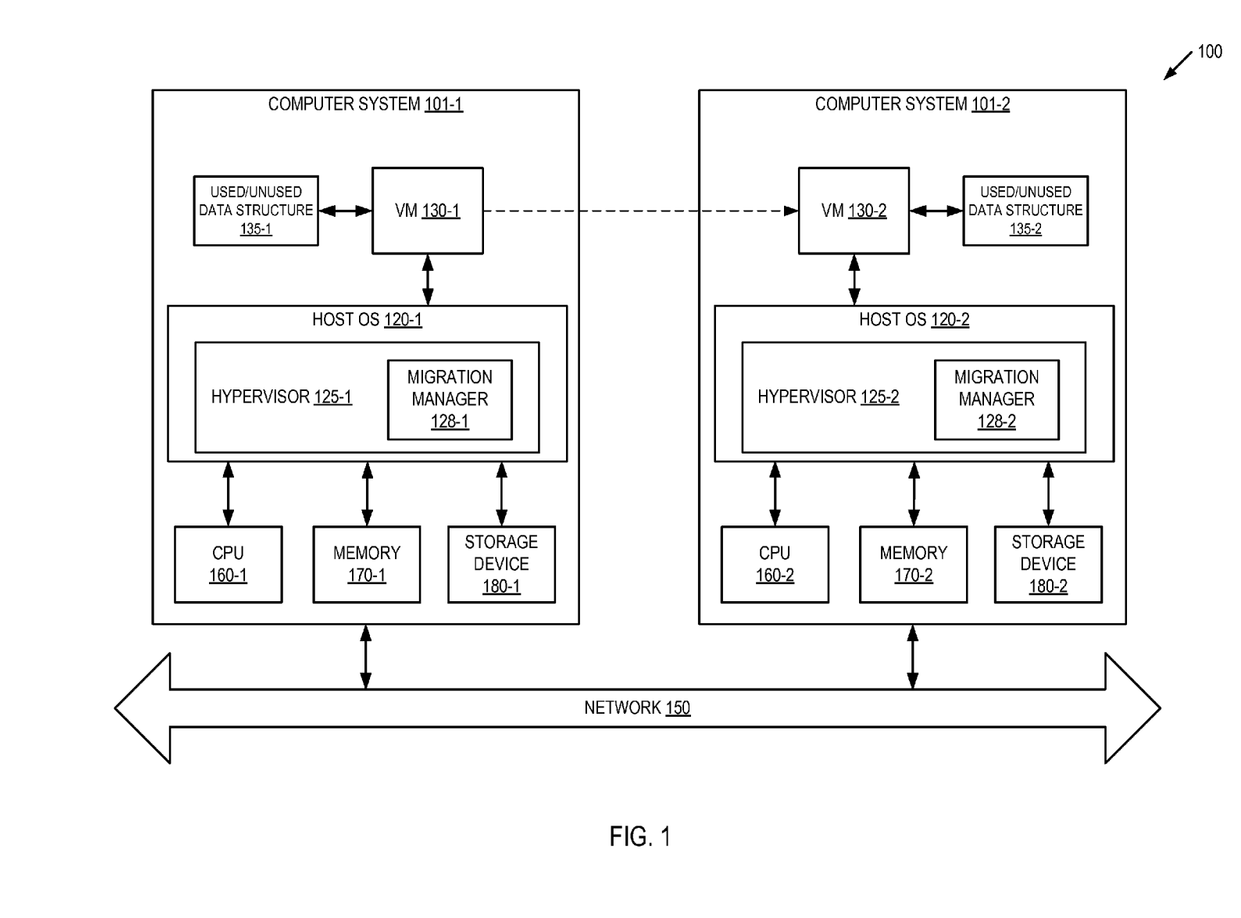
FIG. 1 depicts an illustrative computer system architecture, in accordance with an embodiment of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, system 100 comprises a first computer system 101-1 and a second computer system 101-2 connected via a network 150. Each of computer systems 101-1 and 101-2 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). In some embodiments, computer systems 101-1 and 101-2 may belong to a cluster comprising additional computer systems not depicted in FIG. 1, while in some other embodiments, computer systems 101-1 and 101-2 may be independent systems that are capable of communicating via network 150.

Each of computer systems 101-1 and 101-2 comprises a central processing unit (CPU) 160, a memory 170, which may include volatile memory devices (e.g., random access memory (RAM)), non-volatile memory devices (e.g., flash memory), and/or other types of memory devices), and a storage device 180 (e.g., a magnetic hard disk, a Universal Serial Bus [USB] solid state drive, a Redundant Array of Independent Disks [RAID] system, a network attached storage [NAS] array, etc.). It should be noted that the fact that a single CPU is depicted in FIG. 1 for each of computer systems 101-1 and 101-2 is merely illustrative, and that in some other examples one or both of computer systems 101-1 and 101-2 may comprise a plurality of CPUs. Similarly, in some other examples one or both of computer systems 101-1 and 101-2 may comprise a plurality of storage devices, rather than a single storage device.

Computer system 101-1 runs a host operating system (OS) 120-1 that manages the hardware resources of the computer system and that provides functions such as interprocess communication, scheduling, virtual memory management, and so forth. In one example, host operating system 120-1 also comprises a hypervisor 125-1, which provides a virtual operating platform for virtual machine 130 and that manages its execution. It should be noted that in some alternative examples, hypervisor 125-1 may be external to host OS 120-1, rather than embedded within host OS 120-1.

Virtual machine 130 is a software implementation of a machine that is hosted by computer system 101-1 and that executes programs as though it were an actual physical machine. In some embodiments, these programs may include one or more guest applications and a guest operating system (OS) that manages resources and provides functions such as interprocess communication, scheduling, memory management, and so forth. It should be noted that although, for simplicity, a single virtual machine is depicted in FIG. 1, in some other embodiments computer system 100 may host a plurality of virtual machines.

Figure 2:
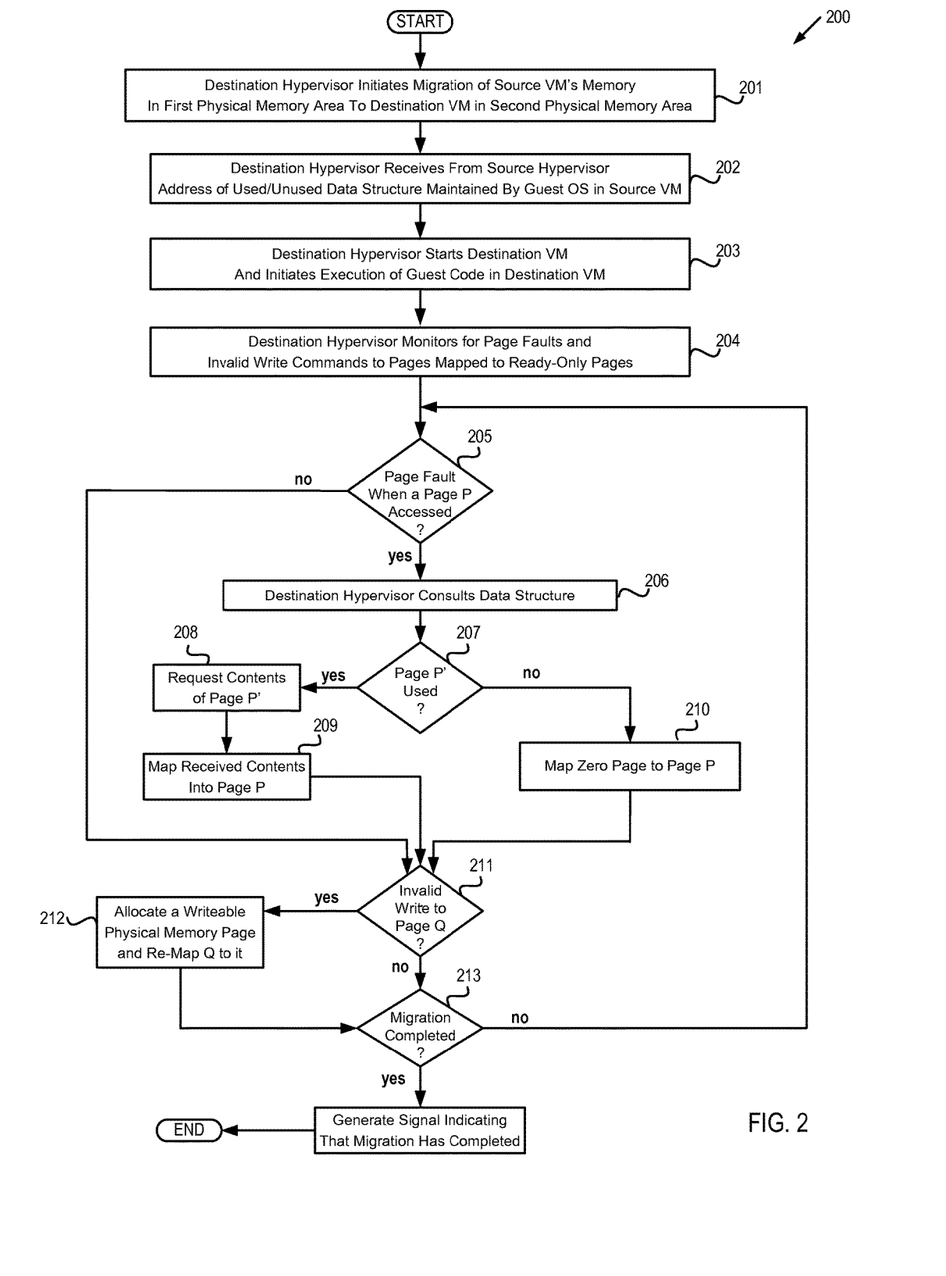
FIG. 2 depicts a flow diagram of one embodiment of a first method for migrating the contents of a memory of a source virtual machine to a destination virtual machine.
Figure 3:
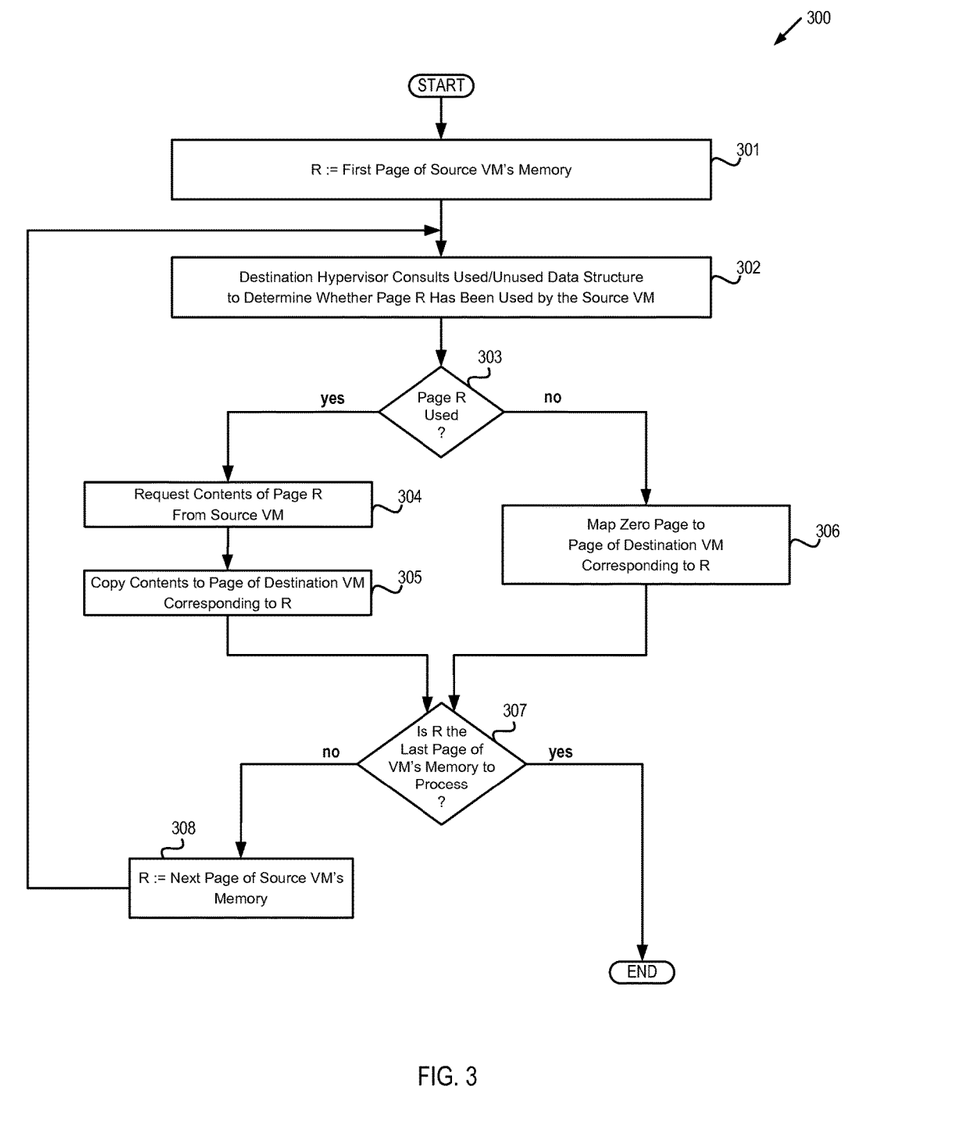
FIG. 3 depicts a flow diagram of one embodiment of a first method for migrating the contents of a memory of a source virtual machine to a destination virtual machine.

In accordance with one example, hypervisor 125-1 may include a migration manager 128-1 that is capable of performing operations of the methods of FIGS. 2 and 3. As is described in detail below, these operations include consulting a data structure 135-1 maintained by a guest to determine whether a page is currently in use by the VM, transmitting and receiving messages that specify an address of the data structure, copying pages from one area of physical memory to another, allocating writeable physical memory pages, mapping pages, and detecting page faults that occur during a migration.

Computer system 101-2, like computer system 101-1, runs a host operating system (OS) 120-2 that manages the hardware resources of the computer system and that provides functions such as interprocess communication, scheduling, virtual memory management, and so forth. In one example, host operating system 120-2 comprises a hypervisor 125-2 that manages virtual machines. It should be noted that in some alternative examples, hypervisor 125-2 may be external to host OS 120-2, rather than embedded within host OS 120-2.

In accordance with one example, hypervisor 125-2, like hypervisor 125-1 of computer system 101-1, includes a migration manager 128-2 that, like migration manager 128-1, is capable of performing operations of the methods of FIGS. 2 and 3, such as consulting a data structure 135-2 maintained by a guest to determine whether a page is currently in use by the VM, transmitting and receiving messages that specify an address of the data structure, copying pages from one area of physical memory to another, allocating writeable physical memory pages, mapping pages, and detecting page faults that occur during a migration.

FIG. 2 depicts a flow diagram of one embodiment of a first method 200 for migrating the contents of a memory of a source VM to a destination. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 2 may be performed simultaneously or in a different order than that depicted.

At block 201, destination hypervisor 125-2 initiates a migration of source VM 130-1's memory in a first physical memory area to destination VM 130-2 in a second physical memory area. As noted above, in some examples the first and second physical memory areas may belong to different machines (e.g., computer systems 101-1 and 101-2), while in some other examples the first and second physical memory areas may be disjoint physical memory areas of the same machine.

At block 202, destination hypervisor 125-2 receives from source hypervisor 125-1 the address of a data structure that indicates which pages of memory of source VM 130-1 have been used by source VM 130-1 and which pages of memory of source VM 130-1 have not been used by source VM 130-1. In one example, the used/unused data structure is maintained by a guest operating system of source VM 130-1.

At block 203, destination hypervisor 125-2 starts destination VM 130-2 and initiates the execution of guest code in destination VM 130-2. At block 204, destination hypervisor 125-2 monitors for page faults (i.e., an attempt to access a page of virtual memory that is not resident in physical memory) that may occur in destination VM 130-2, and for write commands to pages of destination VM 130-2's memory that are mapped to read-only pages (e.g., by a mapping performed at block 210 in a previous iteration of method 200) referred to subsequently as "invalid write commands" for convenience). In one example, blocks 203 and 204 are performed by migration manager 128-2.

At block 205, execution of the method branches based on whether destination hypervisor 125-2 detects a page fault that occurs as a result of an attempted access of any page P of destination VM 130-2's memory. If a page fault is detected, execution proceeds to block 206, otherwise execution continues at block 211.

At block 206, destination hypervisor 125-2 consults the used/unused data structure, and at block 207 determines whether the page of source VM 130-1's memory corresponding to page P of destination VM-130-2's memory (e.g., having the same offset from the base address of the page) has been used. (For convenience, the corresponding page is referred to subsequently as page P' of source VM 130-1's memory). If page P' has been used, execution proceeds to block 208, otherwise execution continues at block 210. In one example, blocks 206 and 207 are performed by migration manager 128-2.

At block 208, destination hypervisor 125-2 sends a request to source hypervisor 125-1 for the contents of page P', and at block 209 destination hypervisor 125-2 maps the received contents into page P. After block 209 is performed, execution continues at block 211.

At block 210, destination hypervisor 125-2 maps to page P a zero page that is external to both the first physical memory area and the second physical memory area. As noted above, in some other embodiments the page mapped to page P may not be a zero page, but may instead be some other physical memory page that is external to both the first physical memory area and the second physical memory area. (e.g., an external page of arbitrary content, an external page in which all bits have the value '1', etc.).

At block 211, execution of the method branches based on whether destination hypervisor 125-2 detects an invalid write attempt to any page Q of destination VM 130-2's memory (e.g., an attempted write to a page Q that was mapped to a zero page rather than copied from source VM 130-1, etc.). If an invalid write attempt is detected, execution proceeds to block 212, otherwise execution continues at block 213.

At block 212, destination hypervisor 125-2 allocates a writeable physical memory page and re-maps page Q to the allocated page, so that subsequent write attempts to page Q can occur without additional processing overhead. After block 212 is performed, execution continues at block 213.

At block 213, execution of the method branches based on whether the migration initiated by destination hypervisor 125-2 at block 201 has completed. If not, execution continues back at block 205, otherwise execution proceeds to block 214.

At block 214, destination hypervisor 125-2 generates a signal that indicates that the migration has completed.

FIG. 3 depicts a flow diagram of one embodiment of a second method 200 for migrating the contents of a memory of a source VM to a destination. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. As noted above, in some embodiments method 300 is initiated at block 201 of method 200, and executes in parallel with the remainder of method 200 (e.g., a process executing method 300 may be spawned at block 201). It should further be noted that in some embodiments blocks depicted in FIG. 2 may be performed simultaneously or in a different order than that depicted.

At block 301, variable R is set to the address of the first page of source VM 130-1's memory. At blocks 302 and 303, destination hypervisor 125-2 consults the used/unused data structure and determines in view of the contents of the data structure whether page R of source VM 130-1's memory has been used. If page R has been used, execution proceeds to block 304, otherwise execution continues at block 306. In one example, blocks 302 and 303 are performed by migration manager 128-2.

At block 304, destination hypervisor 125-2 sends a request to source hypervisor 125-1 for the contents of page R, and at block 305 destination hypervisor 125-2 copies the received contents into a page of destination VM 130-2's memory corresponding to page R. In one example, blocks 304 and 305 are performed by migration manager 128-2.

At block 306, destination hypervisor 125-2 maps a zero page to the page of destination VM 130-2's memory corresponding to page R. As noted above, in some other embodiments the mapped page may not be a zero page, but may instead be some other physical memory page that is external to both the first physical memory area and the second physical memory area.

At block 307, execution of the method branches based on whether page R is the last page of source VM 130-1's memory. If not execution proceeds to block 308, otherwise execution of method 300 has completed.

At block 308, R is set to the address of the next page of source VM 130-1's memory. After block 308 is performed, execution continues back at block 302 for another iteration of the method with the new page R.

It should be noted that although the present disclosure is described in the context of migrating a source VM on one host machine to a destination VM on another host machine (e.g., from a physical memory area of computer system 101-1 to a physical memory area of computer system 101-2, etc.), embodiments of the present disclosure can also be employed for performing VM migration within a single host machine (e.g., migrating a source VM in one physical memory area of a host machine to a destination VM in another physical memory area of the same host machine).

Figure 4:
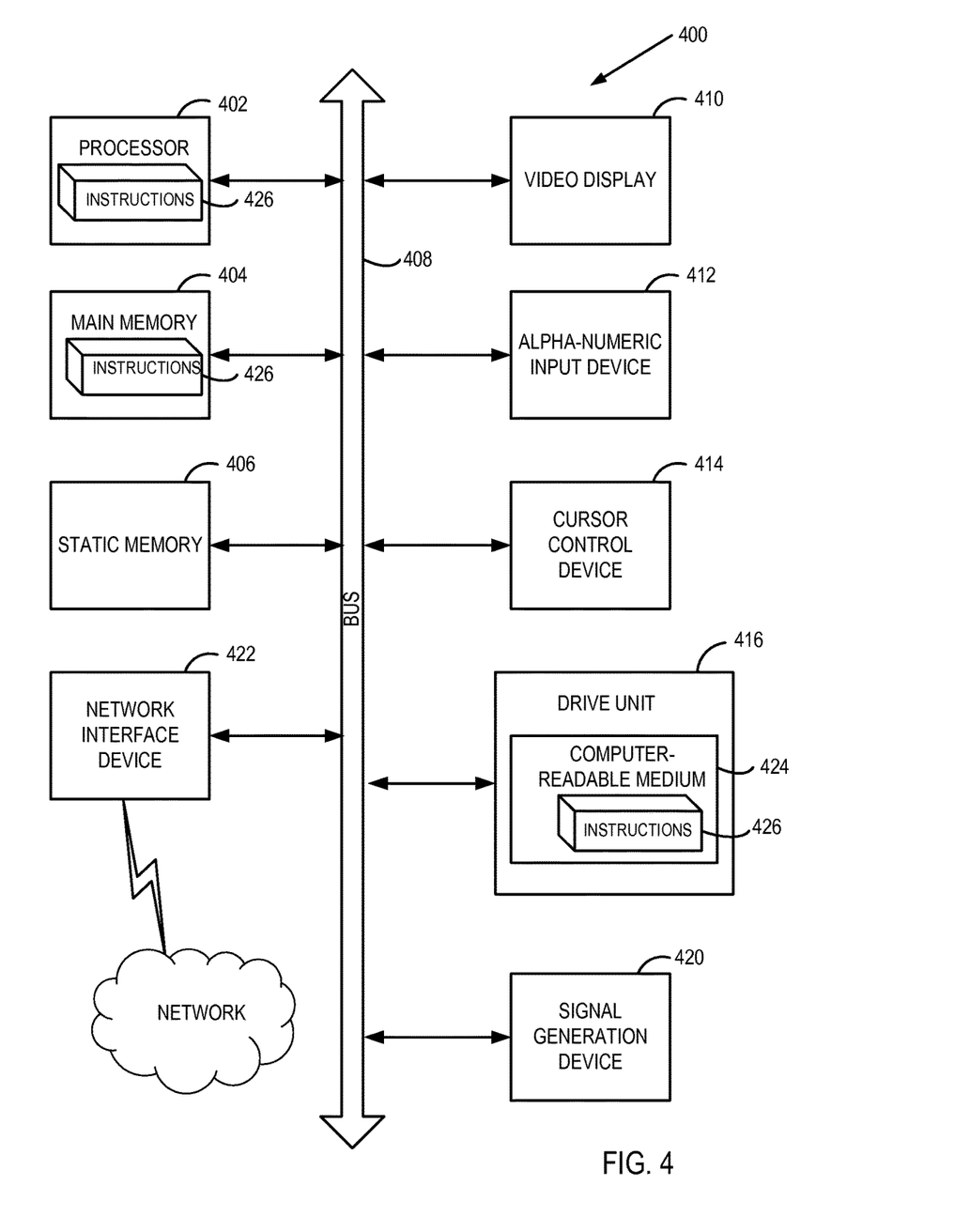
FIG. 4 depicts a block diagram of an illustrative computer system operating in accordance with embodiments of the disclosure.

FIG. 4 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "determining", "receiving", "copying", "mapping", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving by a processing device of a physical machine, via a hypervisor executed by the processing device, a request to migrate contents of a memory of a source virtual machine (VM) in a first physical memory area to a destination VM in a second physical memory area, wherein the first physical memory area and the second physical memory area are disjoint;
executing, by the hypervisor, the destination VM in response to the request;
detecting, by the hypervisor, an access of a page of memory of the destination VM; and
in response to the detecting:
  determining by the hypervisor, in view of a data structure maintained by a guest operating system executing in the destination VM, that a first page of a memory of the source VM in the first physical memory area is currently in use by the destination VM;
  copying by the hypervisor, in view of the first page being used by the destination VM, contents of the first page of the VM memory of the source VM to a corresponding page of the destination VM;
  determining by the hypervisor, in view of the data structure, that a second page of the memory of the source VM in the first physical memory area is not currently in use by the destination VM; and
  mapping by the hypervisor, in view of the second page not being used by the destination VM,
    (i) a physical memory page that is external to the first physical memory area and to the second physical memory area to
    (ii) a page of the destination VM corresponding to the second page.

2. The method of claim 1 wherein the second physical memory area is associated with the physical machine, and wherein the first physical memory area is associated with a different physical machine.

3. The method of claim 2 wherein the copying comprises sending by the hypervisor, to a different hypervisor executed by the different physical machine, a request for the contents of the first page, and wherein the hypervisor receives from the different hypervisor a message specifying an address of the data structure.

4. The method of claim 1 wherein the first physical memory area and the second physical memory area are associated with the physical machine.

5. The method of claim 1 wherein the physical memory page that is external to the first physical memory area and to the second physical memory area is a zero page of the physical machine, and wherein the mapping to the zero page is read-only.

6. The method of claim 5 further comprising:
detecting by the processing device, via the hypervisor, a command to write to the page in the second physical memory area that is mapped to the zero page; and
in response to detecting the command, allocating a writeable physical memory page and mapping the page in the second physical memory to the allocated writeable physical memory page instead of to the zero page.

7. The method of claim 1 further comprising:
determining, by the hypervisor, that every page of the destination VM has been copied or mapped; and
in response to determining that every page of the destination VM has been copied or mapped, generating, by the hypervisor, a signal that indicates that the migration has completed.

8. An apparatus comprising:
one or more physical memories comprising a first physical memory area and a second physical memory area that are disjoint; and
a processing device, operatively coupled to the one or more physical memories, to:
  execute a hypervisor;
  receive, via the hypervisor, a request to migrate contents of a memory of a source virtual machine (VM) in the first physical memory area to a destination VM in the second physical memory area;
  execute via the hypervisor, in response to the request, the destination VM;
  determine via the hypervisor, in view of a data structure maintained by a guest operating system executing in the destination VM, that a first page of a memory of the source VM in the first physical memory area is currently in use by the destination VM;
  copy via the hypervisor, in view of the first page being used by the destination VM, the contents of the first page of the memory of the source VM to a corresponding page of the destination VM;
  determine via the hypervisor, in view of the data structure, that a second page of the memory of the source VM in the first physical memory area is not currently in use by the destination VM; and
  map via the hypervisor, in view of the second page not being used by the destination VM,
    (i) a physical memory page that is external to the first physical memory area and to the second physical memory area to
    (ii) a page of the destination VM corresponding to the second page.

9. The apparatus of claim 8 wherein the first physical memory area is associated with a first physical memory and the second physical memory area is associated with a second physical memory.

10. The apparatus of claim 9 wherein to copy the contents of the first page the hypervisor sends, to a different hypervisor executed by a different physical machine, a request for the contents of the first page, and wherein the hypervisor is further to receive, from the different hypervisor, a message specifying an address of the data structure.

11. The apparatus of claim 8 wherein the physical memory page that is external to the first physical memory area and to the second physical memory area is a zero page, and wherein the mapping to the zero page is read-only.

12. The apparatus of claim 11 wherein the processing device is further to:
detect, via the hypervisor, a command to write to the page in the second physical memory area that is mapped to the zero page; and
in response to detecting the command, allocate, via the hypervisor, a writeable physical memory page and map the page in the second physical memory to the allocated writeable physical memory page instead of to the zero page.

13. The apparatus of claim 8 wherein the processing device is further to:
determine, via the hypervisor, that every page of the destination VM has been copied or mapped; and in response to determining that every page of the destination VM has been copied or mapped, generate a signal that indicates that the migration has completed.

14. A non-transitory computer-readable medium comprising instructions that, when executed by a processing device of a physical machine, cause the processing device to execute a hypervisor to:

receive a request to migrate contents of a memory of a source virtual machine (VM) in a first physical memory area to a destination VM in a second physical memory area, wherein the first physical memory area and the second physical memory area are disjoint;

execute the destination VM in response to the request;

detect an access of a page of memory of the destination VM; and in response to the detecting:
 determine, in view of a data structure maintained by a guest operating system executing in the destination VM, that a first page of a memory of the source VM in the first physical memory area is currently in use by the destination VM;
 copy, in view of the first page being used by the destination VM, contents of the first page of the memory of the source VM to a corresponding page of the destination VM;
 determine, in view of the data structure, that a second page of the memory of the source VM in the first physical memory area is not currently in use by the destination VM; and
 map, in view of the second page not being used by the destination VM,
  (i) a physical memory page that is external to the first physical memory area and to the second physical memory area to
  (ii) a page of the destination VM corresponding to the second page.

15. The non-transitory computer-readable medium of claim 14 wherein the second physical memory area is associated with the physical machine, and wherein the first physical memory area is associated with a different physical machine.

16. The non-transitory computer-readable medium of claim 15 wherein to copy the contents of the first page the hypervisor sends, to a different hypervisor executed by the different physical machine, a request for the contents of the first page, and wherein the hypervisor is further to receive, from the different hypervisor , a message specifying an address of the data structure.

17. The non-transitory computer-readable medium of claim 14 wherein the first physical memory area and the second physical memory area are associated with the physical machine.

18. The non-transitory computer-readable medium of claim 14 wherein the physical memory page that is external to the first physical memory area and to the second physical memory area is a zero page of the physical machine, and wherein the mapping to the zero page is read-only.

19. The non-transitory computer-readable medium of claim 18 wherein the hypervisor is further to:

detect by the processing device, via the hypervisor, a command to write to the page in the second physical memory area that is mapped to the zero page; and in response to detecting the command, allocate a writeable physical memory page and mapping the page in the second physical memory to the allocated writeable physical memory page instead of to the zero page.

20. The non-transitory computer-readable medium of claim 18 wherein the hypervisor is further to:

determine that every page of the destination VM has been copied or mapped; and in response to determining that every page of the destination VM has been copied or mapped, generate a signal that indicates that the migration has completed.

* * * * *